(12) United States Patent
Michael

(10) Patent No.: US 12,712,141 B2
(45) Date of Patent: Aug. 18, 2026

(54) LEAD ASSEMBLY WITH AN INTEGRAL FUSE

(71) Applicant: SHOALS TECHNOLOGIES GROUP, LLC, Portland, TN (US)

(72) Inventor: Dorothy Michael, Greenbrier, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 182 days.

(21) Appl. No.: 18/475,118

(22) Filed: Sep. 26, 2023

(65) Prior Publication Data

US 2024/0105412 A1 Mar. 28, 2024

Related U.S. Application Data

(60) Provisional application No. 63/377,177, filed on Sep. 26, 2022.

(51) Int. Cl.

*H01H 85/22* (2006.01)
*H01B 7/00* (2006.01)
*H01H 85/02* (2006.01)
*H02G 15/18* (2006.01)
*H02G 3/04* (2006.01)

(52) U.S. Cl.

CPC ........... *H01H 85/22* (2013.01); *H01B 7/0045* (2013.01); *H01B 7/009* (2013.01); *H01H 85/0241* (2013.01); *H02G 15/18* (2013.01); *H02G 3/0437* (2013.01)

(58) Field of Classification Search

CPC .. H01H 85/22; H01H 85/0241; H01B 7/0045; H01B 7/009; H02G 15/18; H02G 3/0437

See application file for complete search history.

(56) References Cited

U.S. PATENT DOCUMENTS 4,391,485 A * 7/1983 Urani ................. H01H 85/2035 337/201
6,162,097 A * 12/2000 Liang ................... H01H 85/202 439/620.29
8,192,209 B1 * 6/2012 Li ...................... H01R 13/6591 174/40 R
8,937,249 B2 1/2015 Solon
10,992,254 B2 4/2021 Solon
2008/0233785 A1 9/2008 Yaworski et al.
2010/0164678 A1 * 7/2010 Pentell ............... H01H 85/2035 337/205

(Continued)

FOREIGN PATENT DOCUMENTS

DE 102013106255 A 12/2014

OTHER PUBLICATIONS

International Search Report and Written Opinion mailed Jan. 23, 2024 in related PCT Application No. PCT/US2023/033756.

*Primary Examiner* — Jacob R Crum

(74) *Attorney, Agent, or Firm* — Panitch Schwarze Belisario & Nadel LLP

(57) ABSTRACT

A lead assembly may include a feeder cable, a drop line, and a clip. The feeder cable may be configured to electrically couple to a power device for power delivery. The drop line may be electrically coupled to the feeder cable at a nexus. The drop line may include a fuse positioned proximate the nexus. The clip may be configured to mechanically couple to the feeder cable and the fuse to orient the fuse substantially parallel to a portion of the feeder cable.

16 Claims, 8 Drawing Sheets

(56) References Cited

U.S. PATENT DOCUMENTS

| | | | | |
|---|---|---|---|---|
| 2010/0279555 | A1* | 11/2010 | Azad | H01R 13/6215 439/676 |
| 2012/0309232 | A1* | 12/2012 | Darr | H01H 85/202 439/620.28 |
| 2021/0226581 | A1 | 7/2021 | Solon | |
| 2022/0158391 | A1* | 5/2022 | Guerrero | H01H 85/202 |

* cited by examiner 204
306
314
312
304
304
302
308
302
308
308
304
304
302
308
302
312

LEAD ASSEMBLY WITH AN INTEGRAL FUSE

CROSS-REFERENCE TO RELATED APPLICATIONS

This patent application claims the benefit of and priority to U.S. Provisional App. No. 63/377,177 filed Sep. 26, 2022, titled "LEAD ASSEMBLY WITH A MOLDED T FUSE," which is incorporated in the present disclosure by reference in its entirety.

FIELD

The embodiments discussed in the present disclosure are related to a lead assembly with an integral fuse.

BACKGROUND

Unless otherwise indicated in the present disclosure, the materials described in the present disclosure are not prior art to the claims in the present application and are not admitted to be prior art by inclusion in this section.

A solar power system and an electric vehicle (EV) charger system (generally referred to in the present disclosure as "system") may include a power source (e.g., a solar panel array, a power platform, or an electrical grid) that is electrically coupled to other components of the system via a lead assembly. The lead assembly may include a feeder cable and one or more drop lines that are electrically coupled to the feeder cable. Each of the drop lines may extend from the feeder cable and electrically couple to a component of the system. In addition, each of the drop lines may include a fuse configured to protect the drop lines, the components electrically coupled to the drop lines, or both from overload faults.

Lead assemblies can be unwieldy or difficult to manipulate. For example, drop lines that include fuses can be easily tangled when being packaged, routed, laid out, or moved. This may increase the complexity and/or cost of installing and/or operating the system.

Accordingly, there is a need for an improved lead assembly that reduces the amount of time to package, route, layout, install, and/or move the lead assembly.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments of the present disclosure include a lead assembly that addresses some of the problems discussed above. In some embodiments, a lead assembly is disclosed that minimizes the occasion for the fuses associated with a drop line from tangling with other drop lines or components of the system. In disclosed embodiments, each of the one or more drop lines associated with a lead assembly may include a fuse that is positioned proximate to a nexus between the drop line and the feeder cable. In addition, the lead assembly may include one or more clips that mechanically couples the fuse to the feeder cable. In some embodiments, the clip retains the fuse in a manner that is substantially parallel to the feeder cable, although other orientations may be provided. Retention of the fuse in this manner minimizes the opportunity of fuses becoming entangled. In some embodiments, the lead assembly may also include a housing, such as a mold assembly, that encapsulates at least a portion of the drop line, the fuse, the nexus, and the portion of the feeder cable, thereby protecting the lead assembly from external environmental conditions, such as moisture and the like. The mold assembly may also function to maintain the substantially parallel orientation of the fuse. In addition, the mold assembly may further prevent fuses from catching on other fuses and/or the components of the system.

Therefore, disclosed embodiments of a lead assembly may reduce the amount of time to package, route, layout, and/or move the lead assembly, which may reduce the complexity and/or cost of operating the system.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
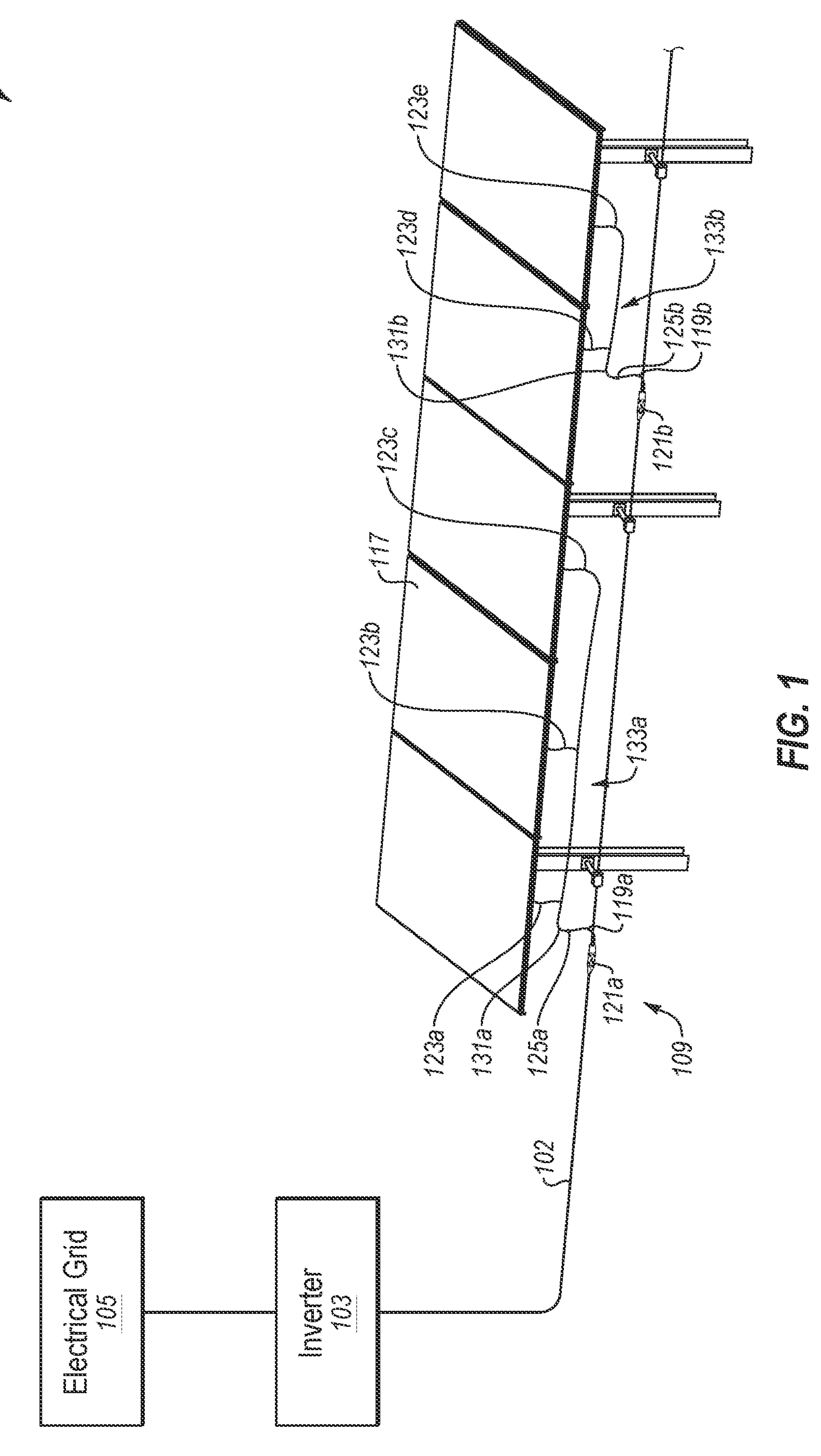
FIG. 1 illustrates an example solar power system that includes a lead assembly.
Figure 2:
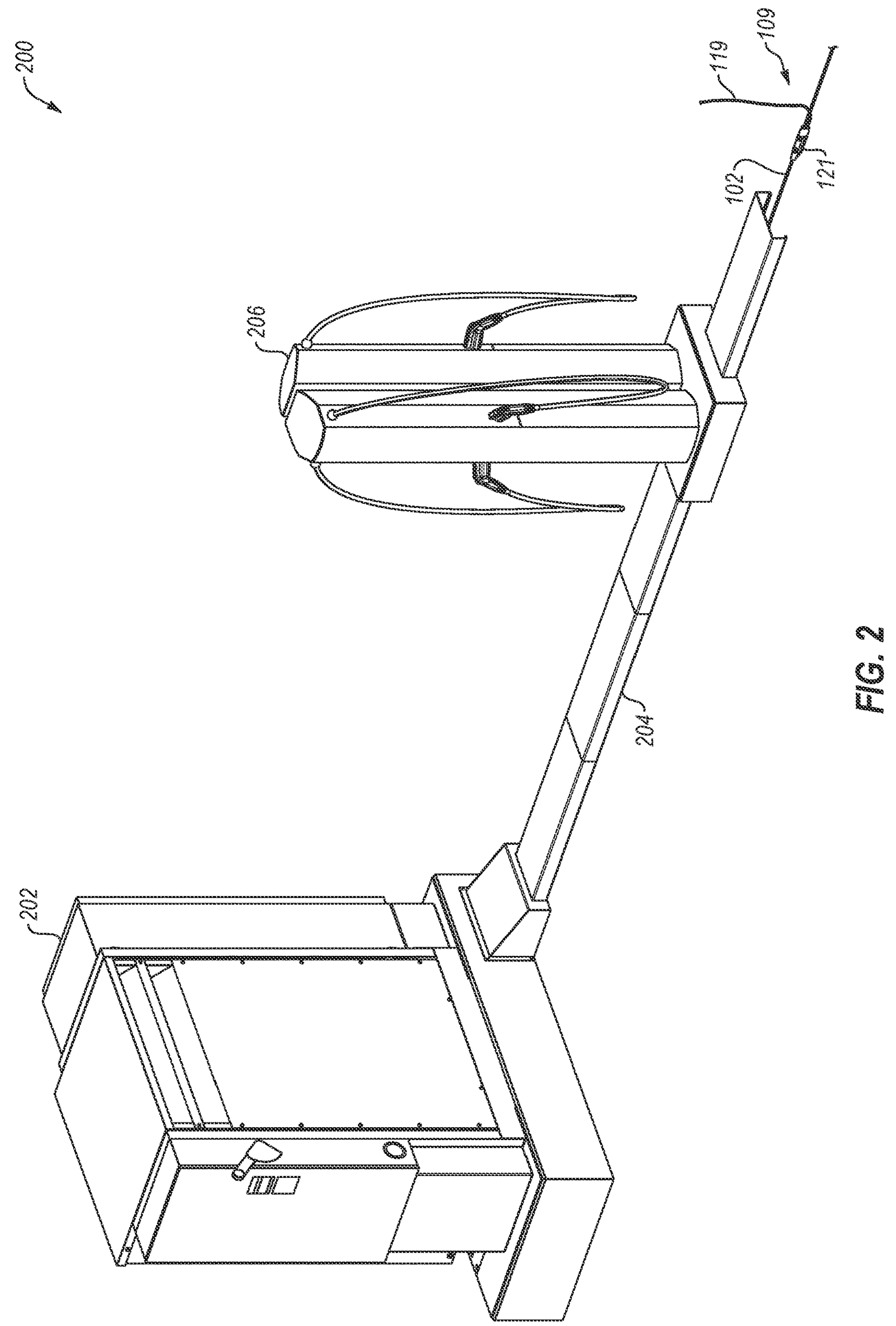
FIG. 2 illustrates an example EV charger system that includes the lead assembly.

4B illustrates an exploded view of the example joint of the lead assembly of FIGS. 1 and 2; and

4C illustrates a cross-sectional view of the example joint of the lead assembly of FIGS. 1 and 2;

all according to at least one embodiment described in the present disclosure.

DESCRIPTION OF EMBODIMENTS

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Referring to FIG. 1, an example solar power system 100 (hereinafter "system 100") is shown. The system 100 may include a solar panel array 117 that is electrically coupled to an inverter 103 via a lead assembly 109. The solar panel array 117 may harvest a flow of energy (e.g., solar radiation) and generate power signals, which may be combined by the lead assembly 109 and passed to the inverter 103. In this example configuration, the inverter 103 may convert the combined power signal from a direct current (DC) power signal to an alternating current (AC) power signal to generate an inverted power signal that is compatible with an electrical grid 105. The inverter 103 may provide the inverted power signal to the electrical grid 105.

The lead assembly 109 may include at least one drop line 119 and a feeder cable 102. The lead assembly 109 may include any appropriate number of drop lines. For example, in the illustrated embodiment, the lead assembly 109 includes two drop lines, denoted at 119*a* and 119*b*. Each of the drop lines 119*a* and 119*b* may be electrically coupled to the feeder cable 102 at a nexus (such as denoted 410 in FIG. 4B).

In one example, the electrical interconnection is provided by stripping wire insulation from corresponding segments of the drop line 119*a* and 119*b* and the feeder cable 102, adjoining respective segments of exposed wire, and securing contact between the segments of exposed wire with any suitable technique, such as a compression lug, soldering, splicing, crimping, or any other appropriate method. The lead assembly 109 may be durable and/or resistant to environmental factors such as temperature fluctuations, debris, and moisture, and may be strong enough to be buried.

In the illustrated example, each drop line 119 electrically couples the lead assembly 109 to one or more solar panels via a wire harness 133 and a drop line connector 125. For example, the drop line 119*a* electrically couples the lead assembly 109 to a first set of solar panels via wire harness 133*a* and drop line connector 125*a* and the drop line 119*b* electrically couples the lead assembly 109 to a second set of solar panels via wire harness 133*b* and drop line connector 125*b*. Each wire harness 133 may include at least one trunk line 131 and at least one branch line 123 electrically coupled to the trunk line 131. Each wire harness 133 may include any appropriate number of branch lines. For example, in the illustrated embodiment, the wire harness 133*a* includes three branch lines, denoted at 123*a-c*, that are electrically coupled to the trunk line 131*a* and the wire harness 133*b* includes two branch lines, denoted at 123*d* and 123*e*, electrically coupled to the trunk line 131*b*. Alternatively, the wire harness 133 may include only the trunk line 131 electrically coupled to the drop line connector 125 and a solar panel and the branch line may be omitted. The feeder cable 102 may electrically couple the lead assembly 109 to the inverter 103 (e.g., a power device) for power delivery to the electrical grid 105.

Referring to FIG. 2, an example EV charger system 200 (hereinafter "system 200") is shown. The system 200 may include a charger platform 206 that is electrically coupled to a power platform 202 via the lead assembly 109. For example, in some embodiments, the system 200 may be a DC powered system and lead assembly 109 may be a positive lead assembly connected to a positive lead of the charger platform 206. As another example, the lead assembly 109 may be a negative lead assembly connected to a negative lead of the charger platform 206. In some embodiments, the system 200 may be an AC powered system and the lead assembly 109 may be arranged to support single phase AC power and/or arranged to support three phase AC power (e.g., using the lead assembly 109, another lead assembly (not illustrated in FIG. 2), and a neutral line (not illustrated in FIG. 2)).

In addition, the lead assembly 109 may electrically couple the power platform 202 and/or the charger platform 206 to other components (not illustrated in FIG. 2) of the system 200. Examples of the other components may include additional charger platforms, additional power platforms, alternative charger stations, or any other appropriate component. The feeder cable 102 may electrically couple the lead assembly 109 to the power platform 202 (e.g., power device) for power delivery to the charger platform 206 and/or the other components.

The power platform 202 may transform or condition input power received from a power source (not illustrated in FIG. 2) to output power that is compatible with the charger platform 206 and/or the other components. The power source may include a solar array, an electrical grid, or any other appropriate power source. The power platform 202 may provide the output power to the charger platform 206 and/or the other components via the lead assembly 109. The charger platform 206 may be configured to electrically couple to a vehicle or to any other device (not illustrated in FIG. 2) and to provide the output power or a transformed version of the output power to the vehicle or the other device.

A cable management system (CMS) 204 may extend between the power platform 202 and the charger platform 206 or between the charger platform 206 and the other components. The CMS 204 may house and/or secure the lead assembly 109 to prevent the lead assembly 109 from being damaged or exposed to external forces. The system 200 is illustrated in FIG. 2 as including the CMS 204 to house and/or secure the lead assembly 109 for example purposes. In some embodiments, the CMS 204 may be omitted, and the lead assembly 109 may be housed or secured in other manners. For example, the lead assembly 109 may be routed within trenches that are backfilled to house or secure the lead assembly 109.

The drop line 119 may electrically couple the lead assembly 109 to the charger platform 206 and/or the other components of the system 200. In FIG. 2, the drop lines 119 electrically coupled to the charger platform 206 are not shown for ease of illustration. The drop line 119 is shown in FIG. 2 to illustrate example configurations of the drop line 119 and the lead assembly 109 within the system 200. The feeder cable 102 may electrically couple the lead assembly 109 to the power platform 202.

With combined reference to FIGS. 1 and 2, each of the drop line 119 may be electrically coupled to the feeder cable 102 at a joint 121. The lead assembly 109 may include a number of joints 121*a-e* that corresponds to the number of the drop lines 119. For example, the lead assembly 109 may include two or more drop lines 119 and two or more joints 121*a-e*. Each of the joint 121 may include a housing, such as a mold assembly (such as denoted 406 in FIGS. 4A and 4B) that orients a portion of the drop line 119 relative to a portion of the feeder cable 102. In addition, the mold assembly may encapsulate at least a portion of a fuse (such as denoted 412 in FIG. 4B), a portion of the drop line 119, a portion of the feeder cable 102, and a clip (such as denoted 414 in FIG. 4B). The clip may retain and orient the fuse relative to the portion of the feeder cable 102. The mold assembly, the clip, or both may maintain orientations of the portion of the drop line 119, the fuse, or both relative to the feeder cable 102. In addition, the mold assembly, the clip, or both may maintain a distance between the feeder cable 102 and the fuse.

The mold assembly may cause the portion of the drop line 119, the fuse, and the clip to move together during movement of the lead assembly 109. The mold assembly, the clip, or both may manage the drop line 119 to reduce the likelihood of the drop line 119 tangling with themself or the other components of the systems 100 and 200. In addition, the mold assembly, the clip, or both may manage the drop line 119 so as to prevent the fuse from catching on other fuse and/or the components of the systems 100 and 200. Management of the lead assembly 109 may reduce a risk of a ground-fault occurring in the lead assembly 109, downtime of the systems 100 and 200, exposure of the fuse to environmental factors, and/or risk of fire at the systems 100 and 200.

The feeder cable 102 may be constructed of six gauge to 1000 thousands of circular mils (MCM) wire. The size of the wire of the feeder cable 102 may be based on a number of drop lines 119 that are electrically coupled to the feeder cable 102, a material of the feeder cable 102, or both. The drop line 119 may be constructed of eighteen to four gauge wire.

Figure 3A:
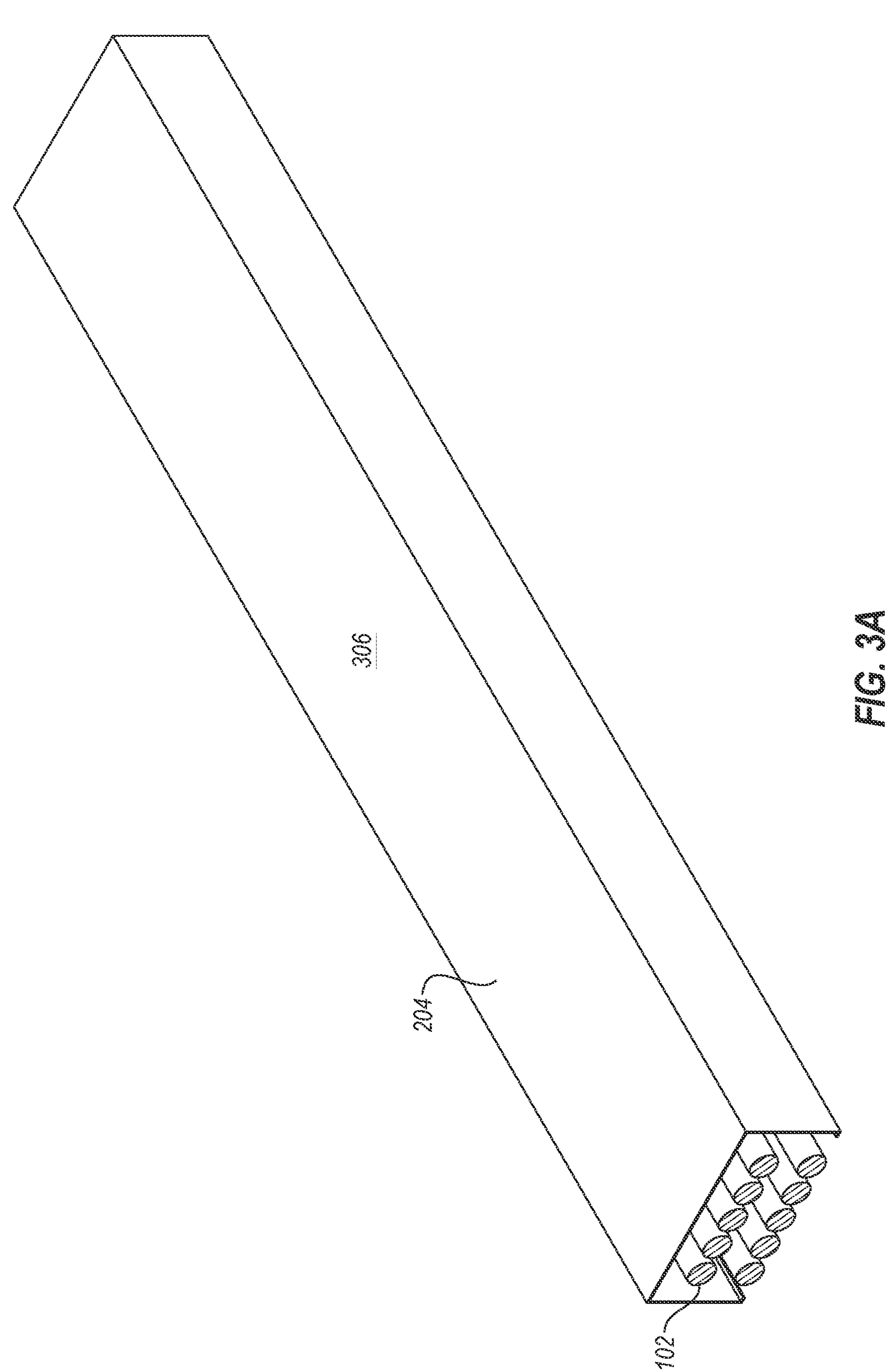
FIGS. 3A, 3B, and 3C illustrate an example cable management system that may be included in the systems of FIGS. 1 and 2.
Figure 3B:
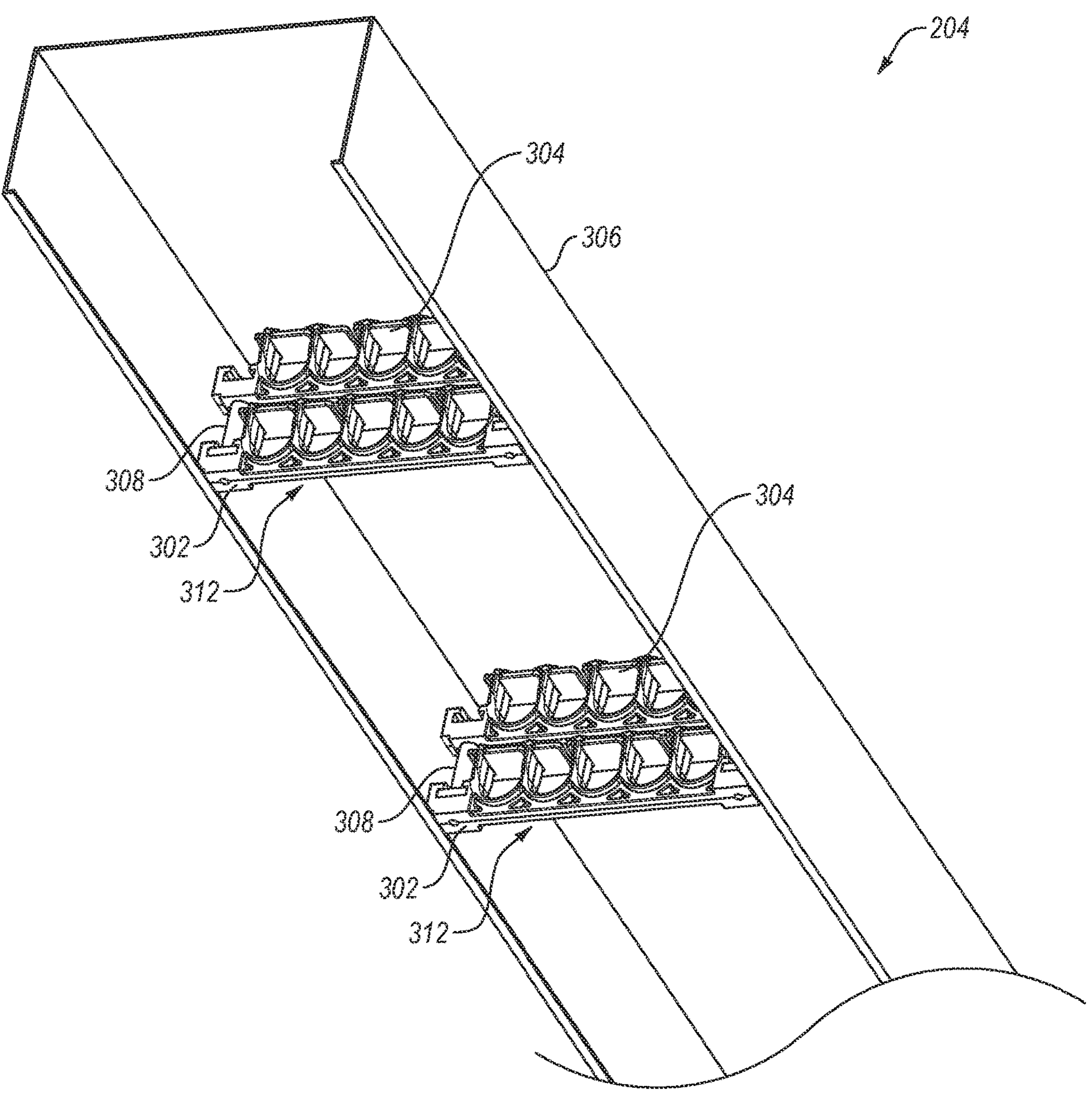
Figure 3C:
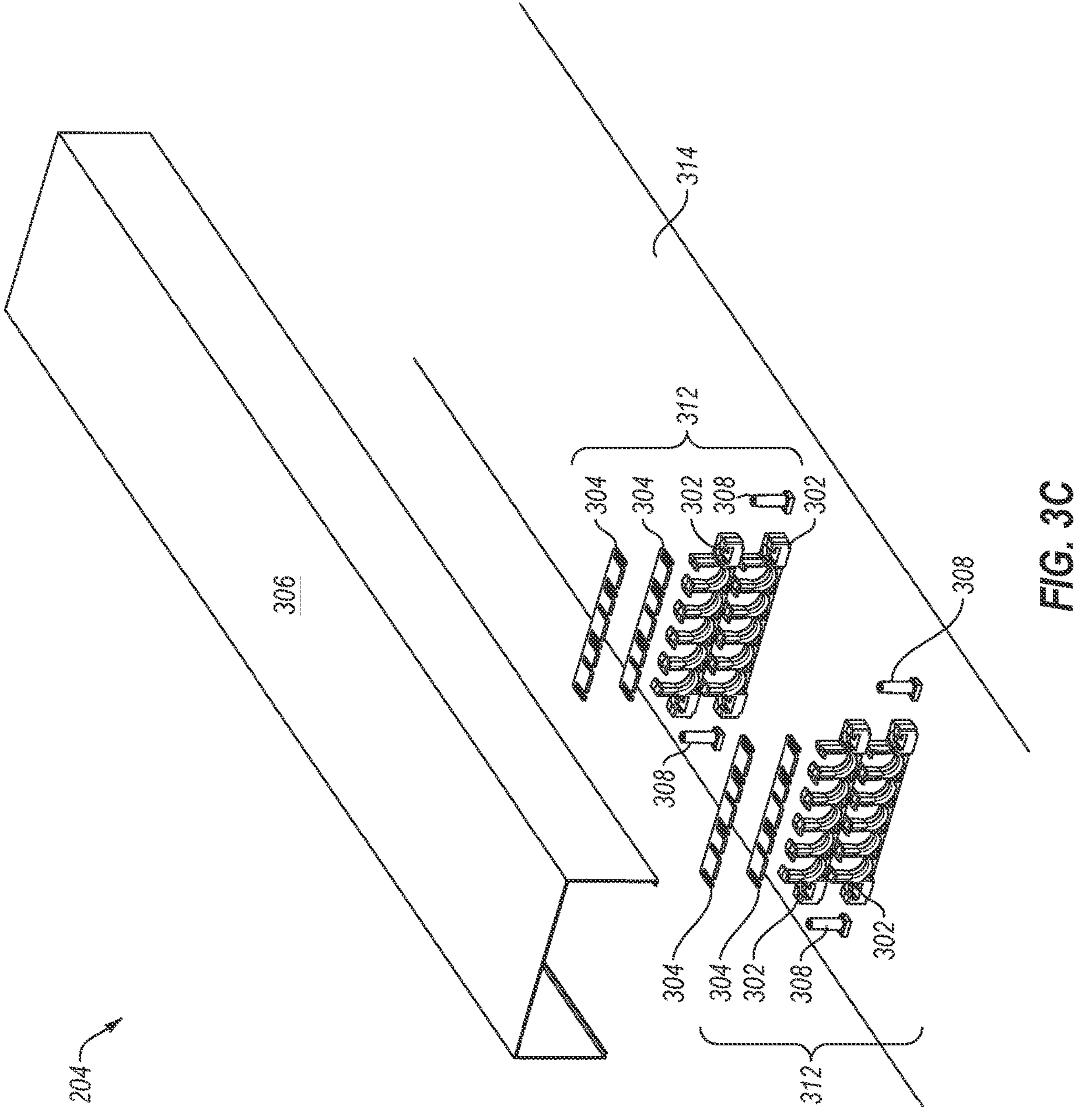

Referring to FIGS. 3A-3C, an example of the CMS 204 of FIG. 2 is shown. FIGS. 3A, 3B, and 3C respectively include a top front perspective view, a bottom front perspective view, and an exploded top front perspective view of the CMS 204. As illustrated, the CMS 204 may include multicable clips 302, retention plates 304, a cable raceway 306, or risers 308. FIG. 3A additionally illustrates example feeder cables 102 that may be managed, protected, and/or housed by the CMS 204. A single instance of the feeder cables 102 is numbered in FIG. 3A for simplicity of the illustration. The feeder cables 102 are omitted from FIGS. 3B and 3C for clarity of the illustrations.

Each of the multicable clips 302 includes multiple channels to receive and secure the feeder cables 102. For example, each of the multicable clips 302 illustrated in FIGS. 3B and 3C includes five channels to receive and secure five feeder cables 102. Additionally, each channel may receive and secure one or more feeder cables 102. The dimensions of each channel and/or feeder cable 102 may be selected according to the number of feeder cables 102 to be received in each channel. In these and other embodiments, the number of feeder cables 102 that may be housed by the CMS 204 may be determined based on the National Electric Code. The retention plates 304 may couple to the multicable clips 302 to retain the feeder cables 102 in the channels after placement therein. As illustrated, each of the multicable clips 302 may be stacked with another multicable clip 302 through the risers 308. The risers 308 may couple the multicable clips 302 together (optionally with one or more threaded fasteners or other fasteners).

A set of stacked multicable clips 302 together with corresponding retention plates 304 and risers 308 (and optional fasteners) may be referred to herein as a stacked retention assembly 312. The stacked retention assemblies 312 may be spaced apart along a length of the cable raceway 306 to provide support and management of the feeder cables 102 along the length of the cable raceway 306. For example, the stacked retention assemblies 312 may be spaced every eighteen to twenty-four inches. By stacking multiple multicable clips 302 together, each stacked retention assembly 312 may secure in a single location along the length of the cable raceway 306 more feeder cables 102 than a single multicable clip 302 by itself.

Within each stacked retention assembly 312 one of the multicable clips 302 will be closer to and/or coupled directly to an installation surface 314 while the other multicable clips 302 are spaced further from the installation surface 314. The multicable clip 302 that is closest to and/or coupled directly to the installation surface 314 may be referred to herein as a base multicable clip 302. The multicable clips 302 that are spaced further from the installation surface 314 than the base multicable clip 302 may be referred to herein as the elevated multicable clips 302 because they are spaced apart from or elevated relative to the installation surface 314.

The use of "base" and "elevated" in describing the multicable clips 302 in stacked retention assemblies 312 should not be construed to require that the stacked retention assemblies 312 have a particular orientation relative to any given reference frame. Rather, the use of "base" and "elevated" in describing the multicable clips 302 in stacked retention assemblies 312 is merely used as an aid in distinguishing between the multicable clips 302 in a stacked retention assembly 312 notwithstanding any particular orientation they may have relative to a given reference frame. In FIG. 3C, the installation surface 314 may be a floor or ground (i.e., gravity is down in the orientation of FIG. 3C) such that the multicable clip 302 at the bottom of each stacked retention assembly 312 is the base multicable clip 302 while the other multicable clip 302 in each stacked retention assembly 312 is the elevated multicable clip 302. If the installation surface 314 were instead a ceiling surface (i.e., gravity is up in the orientation of FIG. 3C), the multicable clip 302 that is closest to the installation surface 314 would still be referred to as the base multicable clip 302 and the multicable clip 302 that is furthest from the installation surface 314 would still be referred to as the elevated multicable clip 302 despite being lower than the base multicable clip 302 relative to the gravitational reference frame.

The cable raceway 306 may be configured to engage at least one of the multicable clips 302 of each of the stacked retention assembly 312 along its length to enclose the stacked retention assemblies 312 at least partially (or portions thereof) and the feeder cables 102. For example, a retention flange or other structure of the cable raceway 306 may be configured to engage a shoulder or other structure defined in a bottom of each base multicable clip 302.

Figure 4A:
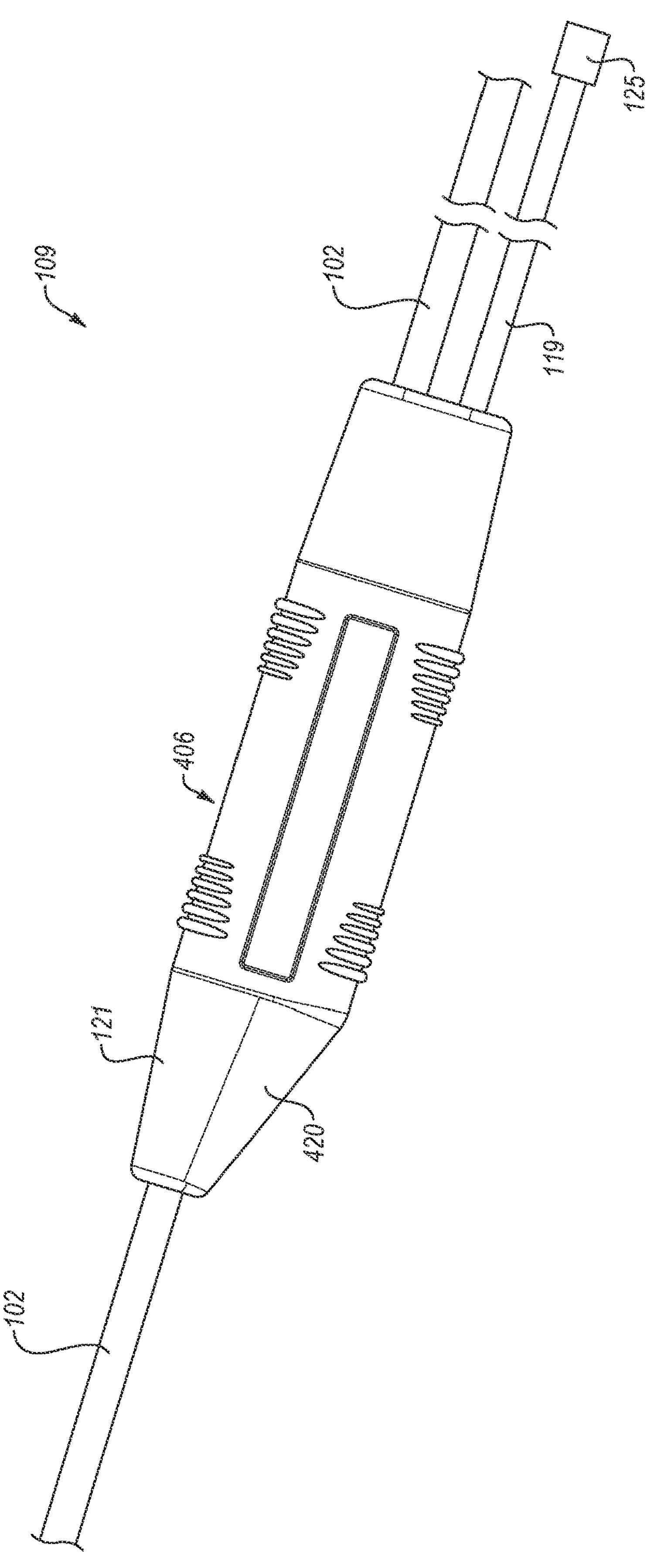
FIG. 4A illustrates a perspective view of an example joint of the lead assembly of FIGS. 1 and 2.
Figure 4B:
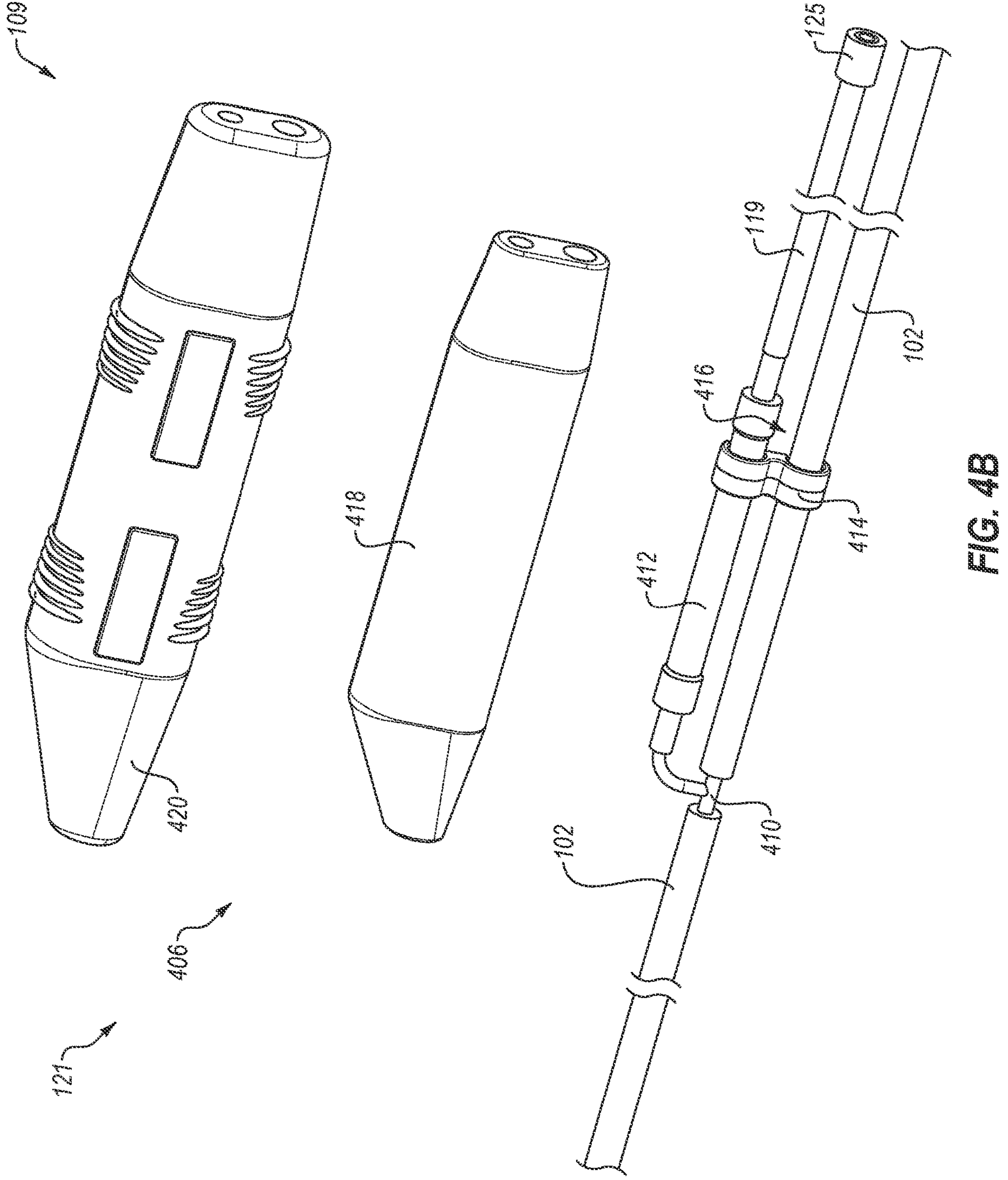
Figure 4C:
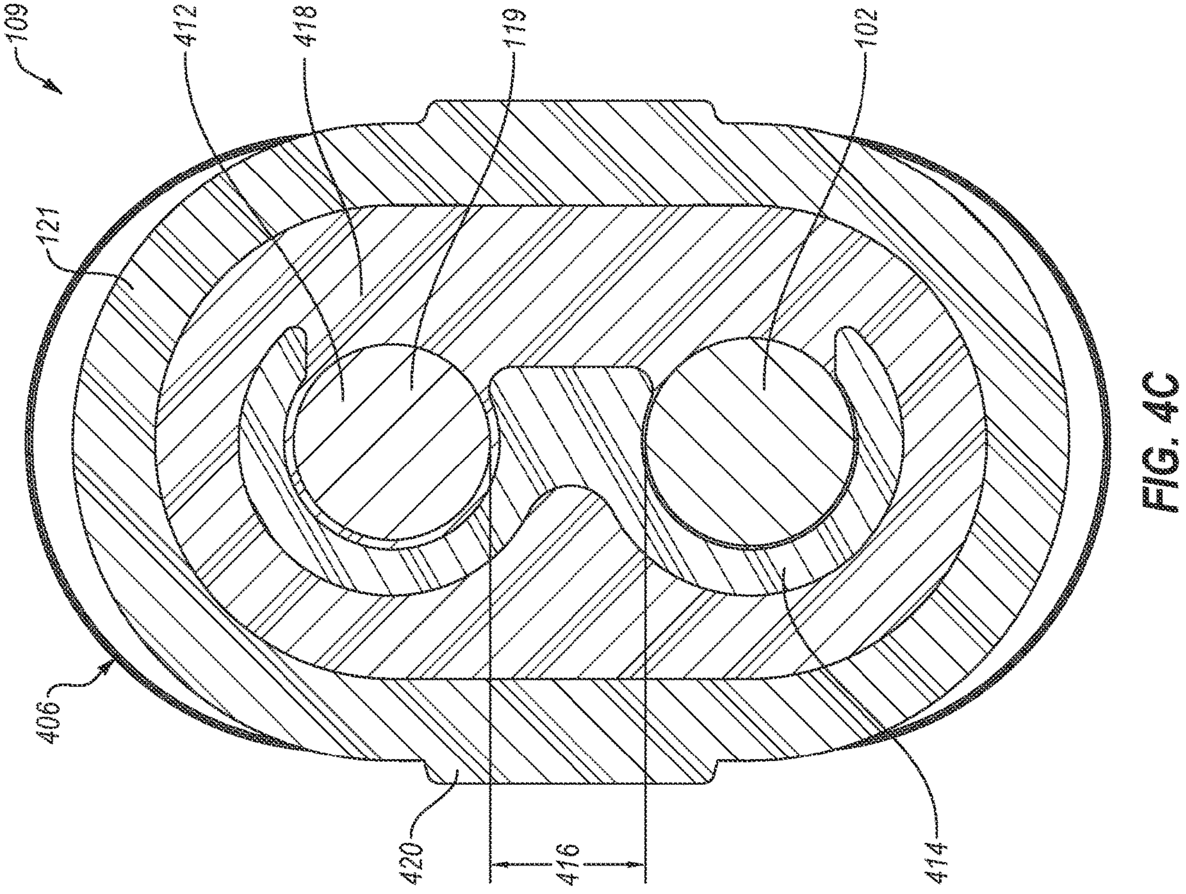

With reference to FIGS. 4A-4C, an example joint 121 of the lead assembly 109 of FIGS. 1 and 2 is shown. As shown in FIG. 4B, the drop line 119 may be electrically coupled to the feeder cable 102 at a nexus 410. The drop line 119 may include a fuse 412 that is electrically coupled to the nexus 410. The fuse 412 may be electrically disposed between the feeder cable 102 and the drop line connector 125. The drop line 119 may terminate in the drop line connector 125, which may be configured to electrically and mechanically couple the drop line 119 to the wire harness 133.

The fuse 412 may be positioned proximate the nexus 410. For example, the fuse 412 may be positioned a distance equal to or between 0.1 inch and one inch from the nexus 410 In some embodiments, the fuse 412 may be configured to protect at least the drop line 119 and/or a connected component from overload faults. The fuse 412 may be configured to sever an electrical connection between the feeder cable 102 and the connected component in instances in which a current through the fuse 412 is greater than a threshold level. In some embodiments, the fuse 412 may include an in-line fuse.

In some embodiments, the clip 414 may maintain a mechanical coupling of the drop line 119, the fuse 412, or the feeder cable 102. Specifically, the clip 414 may mechanically couple the feeder cable 102 and the fuse 412 to each other. The clip 414 may mechanically couple to the feeder cable 102 and the fuse 412 so as to orient the fuse 412 substantially parallel to a portion of the feeder cable 102. For example, the fuse 412 may extend in a direction that is substantially parallel to a direction in which the portion of the feeder cable 102 extends. Alternatively, the clip 414 may orient the fuse 412 in arrangements other than substantially parallel. For example, the clip 414 may orient the fuse 412 at an angle that is between twenty and sixty degrees offset from the direction in which the portion of the feeder cable 102 extends. In addition, the clip 414 may mechanically couple to the feeder cable 102 and the fuse 412 so as to orient a portion of the drop line 119 substantially parallel to a portion of the feeder cable 102. As used in the present disclosure, the term "substantially parallel" may mean two items extend in directions that are parallel relative to each other or are within a range of plus ten degrees to minus ten degrees of parallel relative to each other. Alternatively, the clip 414 may orient the portion of the drop line 119 in arrangements other than substantially parallel. For example, the clip 414 may orient the portion of the drop line at an angle that is between twenty and sixty degrees offset from the direction in which the portion of the feeder cable 102 extends. The clip 414 may create a distance 416 between the fuse 412 and the portion of the feeder cable 102. The distance 416 between the fuse 412 and the portion of the feeder cable 102 may be between 0.01 inch and one inch.

In some embodiments, the electrical coupling and/or the mechanical coupling of the drop line 119 and the feeder cable 102 may be maintained by a mold assembly 406. The mold assembly 406 may include an undermold 418, an overmold 420, or both. In some embodiments, the overmold 420 may encapsulate the undermold 418. Alternatively, or additionally, the overmold 420 may surround at least a portion of the undermold 418.

The undermold 418 may encapsulate a portion of the drop line 119. For example, the undermold 418 may encapsulate a portion of a wire of the drop line 119 and the fuse 412. In addition, the undermold 418 may encapsulate the nexus 410, the clip 414, and a portion of the feeder cable 102. In some embodiments, the undermold 418 may maintain the orientation of the fuse 412 relative to the portion of the feeder cable 102. In these and other embodiments, the undermold may maintain the orientation of the portion of the drop line 119 relative to the portion of the feeder cable 102. Further, the undermold 418, the overmold 420, or both may be configured to prevent fluid from reaching the nexus 410, the fuse 412, or both. Additionally or alternatively, the undermold 418, the overmold 420, or both may prevent the portion of the drop line 119, the fuse 412, the nexus 410, or the portion of the feeder cable 102 from being exposed to the environmental factors.

The clip 414, the undermold 418, the overmold 420, or some combination thereof may cause the distance 416 between the fuse 412 and the portion of the feeder cable 102 to remain constant during movement of the lead assembly 109. In some embodiments, the overmold 420 may cause the portion of the drop line 119, the fuse 412, the clip 414, and the undermold 418 to move together during movement of the lead assembly 109.

In some embodiments, the fuse 412 may be configured as a one-time use fuse. When the fuse 412 severs the electrical connection between the feeder cable 102 and the connected device (e.g., due to the current through the fuse 412 being greater than the threshold level), the joint 121, the drop line 119 may be replaced in the lead assembly 109.

In some embodiments, the overmold 420 may define at least one aperture (not illustrated in FIGS. 4A and 4B) for receiving zip-ties, and the like, for securing the lead assembly 109 upon installation. For example, a zip-tie through the corresponding aperture of the overmold 420 may be used to couple the joint 121 illustrated in FIGS. 4A-4C to a structure.

A single drop line 119 is illustrated in FIGS. 4A-4C as being electrically coupled to the feeder cable 102 at the nexus 410. However, more than one drop line 119 may be electrically coupled to the feeder cable 102 at the nexus 410. For example, an additional drop line may also be electrically coupled to the feeder cable 102 at the nexus 410. The additional drop line 119 may include an additional fuse, an additional clip, an additional undermold, an additional overmold, or some combination thereof. The additional clip, the additional undermold, or the additional overmold may operate the same as or similar to the clip 414, the undermold 418, or the overmold 420 but in relation to a different portion of the feeder cable 102.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A lead assembly comprising:

a feeder cable configured to electrically couple to a power device for power delivery;

a drop line electrically coupled to the feeder cable at a nexus, the drop line comprising a first part, a second part, and a fuse, the fuse coupled between the first part and the second part; and a clip configured to mechanically couple to the feeder cable and the fuse to orient the fuse substantially parallel to a portion of the feeder cable.

2. The lead assembly of claim 1, wherein the clip is further configured to cause a distance between the fuse and the portion of the feeder cable to remain constant during movement of the lead assembly.

3. The lead assembly of claim 1 further comprising an undermold configured to encapsulate a portion of the drop line, the clip, and the portion of the feeder cable to maintain the substantially parallel orientation of the fuse relative to the portion of the feeder cable, the portion of the drop line comprising at least a portion of the first part, the fuse, and at least a portion of the second part.

4. The lead assembly of claim 3 further comprising an overmold configured to encapsulate the undermold.

5. The lead assembly of claim 3, wherein the undermold is configured to encapsulate the portion of the drop line, the clip, and the portion of the feeder cable to prevent fluid from reaching the nexus.

6. The lead assembly of claim 1, wherein the drop line comprises a first drop line, the fuse comprises a first fuse, the nexus comprises a first nexus, and the clip comprises a first clip, the lead assembly further comprising:

a second drop line electrically coupled to the feeder cable at a second nexus, the second drop line comprising a first part, a second part, and a second fuse, the second fuse coupled between the first part and second part of the second drop line; and a second clip configured to mechanically couple to the feeder cable and the second fuse to orient the second fuse substantially parallel to a different portion of the feeder cable.

7. The lead assembly of claim 1, wherein the drop line comprises a first drop line, the fuse comprises a first fuse, and the clip comprises a first clip, the lead assembly further comprising:

a second drop line electrically coupled to the feeder cable at the nexus, the second drop line comprising a first part, a second part, and a second fuse, the second fuse coupled between the first part and the second part of the second drop line; and a second clip configured to mechanically couple to the feeder cable and the second fuse to orient the second fuse substantially parallel to a different portion of the feeder cable.

8. The lead assembly of claim 1 further comprising a drop line connector electrically coupled to the fuse, the drop line connector configured to electrically and mechanically couple the drop line to at least one of a solar panel, a power platform, or a charger platform.

9. The lead assembly of claim 8, wherein the fuse is electrically disposed between the feeder cable and the drop line connector.

10. The lead assembly of claim 1, wherein the power device comprises a power source configured to provide a power signal to the feeder cable.

11. A lead assembly comprising:

a feeder cable configured to electrically couple to a power device for power delivery;

a first drop line electrically coupled to the feeder cable at a first nexus, the first drop line comprising a first fuse positioned proximate to the first nexus;

a first clip mechanically coupled to the feeder cable and the first fuse to orient a portion of the first drop line substantially parallel along a first portion of the feeder cable;

a second drop line electrically coupled to the feeder cable at a second nexus, the second drop line comprising a second fuse positioned proximate to the second nexus; and a second clip mechanically coupled to the feeder cable and the second fuse to cause a distance between the second fuse and a second portion of the feeder cable to remain constant during movement of the lead assembly.

12. The lead assembly of claim 11, further comprising:

an undermold that encapsulates a portion of the first drop line comprising the first fuse, the first clip, and the first portion of the feeder cable to maintain the substantially parallel orientation of the first fuse relative to the first portion of the feeder cable; and an overmold surrounding at least a portion of the undermold to cause the portion of the first drop line comprising the first fuse, the first clip, and the undermold to move together during movement of the lead assembly.

13. The lead assembly of claim 12, wherein the first clip and the undermold cause a distance between the first fuse and the first portion of the feeder cable to remain constant during movement of the lead assembly.

14. The lead assembly of claim 12, wherein the undermold is configured to prevent fluid from reaching the first nexus.

15. The lead assembly of claim 12, further comprising:

a third drop line electrically coupled to the feeder cable at a third nexus, the third drop line comprising a third fuse positioned proximate to the third nexus; and a third clip mechanically coupled to the feeder cable and the third fuse to orient a portion of the third drop line substantially parallel along a third portion of the feeder cable.

16. The lead assembly of claim 12 further comprising:

a second undermold that encapsulates a portion of the second drop line comprising the second fuse, the second clip, and the second portion of the feeder cable to maintain the constant distance between the second fuse and the second portion of the feeder cable; and a second overmold surrounding at least a portion of the second undermold to cause the second drop line comprising the second fuse, the second clip, and the second undermold to move together during movement of the lead assembly.

* * * * *